United States Patent [19]

Killat et al.

[11] Patent Number: 5,067,124
[45] Date of Patent: Nov. 19, 1991

[54] PACKET SWITCHING NETWORK FOR A COMMUNICATION SYSTEM

[75] Inventors: Ulrich Killat, Hamburg; Johann Kruger, Quickborn, both of Fed. Rep. of Germany

[73] Assignee: U.S. Philips Corporation, New York, N.Y.

[21] Appl. No.: 414,036

[22] Filed: Sep. 28, 1989

[30] Foreign Application Priority Data

Oct. 1, 1988 [DE] Fed. Rep. of Germany ....... 3833490

[51] Int. Cl.$^5$ .......................... H04Q 11/04; H04J 3/24
[52] U.S. Cl. ...................................... 370/60; 370/94.1
[58] Field of Search ....................... 376/60, 60.1, 94.1, 376/94.2; 370/58.1, 58.2, 58.3

[56] References Cited

U.S. PATENT DOCUMENTS

| | | | |
|---|---|---|---|
| 4,623,996 | 9/1986 | McMillen | 370/60 |
| 4,754,451 | 6/1988 | Eng et al. | 370/60 |
| 4,760,570 | 7/1988 | Acampora et al. | 370/60 |
| 4,868,813 | 9/1989 | Suzuki | 370/60 |
| 4,935,922 | 6/1990 | Wicklund et al. | 370/60 |
| 4,969,149 | 11/1990 | Killat et al. | 370/60 |

FOREIGN PATENT DOCUMENTS 183592 6/1986 European Pat. Off. .

Primary Examiner—Douglas W. Olms
Assistant Examiner—H. Kizoll
Attorney, Agent, or Firm—Anne E. Barschall

[57] ABSTRACT

The invention relates to a switching network for a communication system, comprising m/1 stages and in which cells are transmitted in accordance with a time-division multiple access method and the switching is effected on the basis of the routing information contained in the header. The arriving cells are temporarily stored in a buffer until a free frame is available. The queues built up in the buffers of the m/1 stages are to be processed in the most fair manner. For this purpose it is proposed to assign a memory to each m/1 stage of each auxiliary line ($Z1 \ldots Zm$), to which memory are applied the results of the comparisons between routing information and address of the trunk line (A) and to determine for the decision circuits the order in which the cells stored in the buffers (B) are read out.

12 Claims, 2 Drawing Sheets

PACKET SWITCHING NETWORK FOR A COMMUNICATION SYSTEM

BACKGROUND OF THE INVENTION

The invention relates to a switching network for a communication system. The network is structured like a space-division multiplex switching network comprising m/1 stages which include auxiliary lines and each have a trunk line. In the network cells are transmitted in accordance with a time-division multiple access method. The cells are switched through on the basis of the routing information contained in the cell header. The cell arriving at the auxiliary line is written into the buffer dedicated to the trunk line if the routing information and address of this trunk line match. A decision circuit is included. The switching network is specifically suitable for use with asynchronous time-division multiple access methods.

The amount of data traffic to be transmitted through communication networks is ever increasing. In order to manage the data traffic separate switching systems were constructed for data traffic and telephone traffic. Since the data rates of the data signals to be transmitted may assume a multiplicity of different values it is hard to combine data switching and telephone switching in a single network junction.

In European Patent Application having publication number 0 183 592 a wideband transmission system was proposed in which messages are subdivided into cells and transmitted over wideband transmission links according to an asynchronous time-division multiple access method. The cells may have the same length or different lengths. They consist of useful information as well as address information, the address information being accommodated in a header. The number of bits of a cell is designated as its length while values between 120 and 256 bits are proposed as standard cell lengths for the useful information and 32 or 16 bits for the header. The time intervals in which cells are transmitted are designated as frames. A frame may be empty or comprise a valid cell. Between two subscribers of the wideband transmission system there is a virtual connection which is maintained in that the cells sent by the subscriber arrangements comprise unique header codes, enabling the switching junctions to transport the cells correctly. The cells arriving at the junction from an incoming line are transmitted over an outgoing line by conversion of the header. As two or more cells may arrive for the same outgoing line during a single frame, so-called queue buffers are to be provided at the switching junction. One or more of these cells will be buffered in the queue buffer for the time being until a free frame is available.

In view of the queue buffer arrangement the switching junctions of centrally buffered systems (as known, for example, from European Patent Application having the publication number 0 183 592) or systems which are buffered decentrally. With centrally buffered systems there is only a single buffer in which each incoming line delivers its cells and from which each outgoing line again reads the cells meant for it. Systems having a decentralized buffering are distinguished in that cells are exclusively buffered on the input side or in that buffers are exclusively arranged on the output side or in that systems are concerned having input and output buffering. In this context also switching network buffering is referred to when a buffer is assigned to each junction of a switching network.

In DE-PS 38 23 8870.6 is proposed a switching network comprising m/1 stages. Analogous to a space-division multiplex switching network auxiliary lines are arranged in the rows and trunk lines in the columns, whilst to each m/1 stage m auxiliary lines and one output line are connected. To each auxiliary line of an m/1 stage is assigned its own evaluation logic for evaluating the information contained in the header. Each auxiliary line is connected to a buffer accommodating the cells supplied thereto through the auxiliary line insofar as a comparator dedicated to the buffer has established that the address of the trunk line stored in an address memory matches the routing information contained in the header. If cells simultaneously occur at various auxiliary lines of an m/1 stage and are intended for the trunk line of this stage, these cells can also be transported simultaneously to the buffer. However, they can only be read from the memory and written onto the trunk line sequentially. For this purpose each m/1 stage is assigned a decision circuit which determines the order of the trunk lines to be switched through. The order is determined by the spatial arrangement of the trunk lines. If various cells arrive at an auxiliary line of an m/1 stage, which are intended for the trunk line of this stage and are stored in a queue in the buffer, this will also be taken into account.

SUMMARY OF THE INVENTION

It is an object of the invention to improve a switching network of the type set forth in the opening paragraph, in that the queues formed in the buffers of the m/1 stages are processed in the most fair manner. This implies that cells intended for the same trunk line and sequentially arriving at an m/1 stage, leave this stage in the same order as the one in which they arrived.

This object is achieved in accordance with the invention by means of a switching network characterized in that each m/1 stage of each auxiliary line (Z1 ... Zm) is assigned a memory (FIFO) to which are applied the results of the comparisons of the routing information and address of the trunk line (A). The switching network is further characterized in that the contents of the memory (FIFO) are applied to the decision circuits (CA) which, on the basis of these contents, determine the order in which the cells stored in the buffers (B) are read out. Further objects and advantages will be apparent in the following detailed description.

BRIEF DESCRIPTION OF THE DRAWINGS

In the sequel the invention and its embodiments will be further explained with reference to the embodiments diagrammatically shown in the FIGS. 1 to 3, in which.

DETAILED DESCRIPTION

Figure 1:
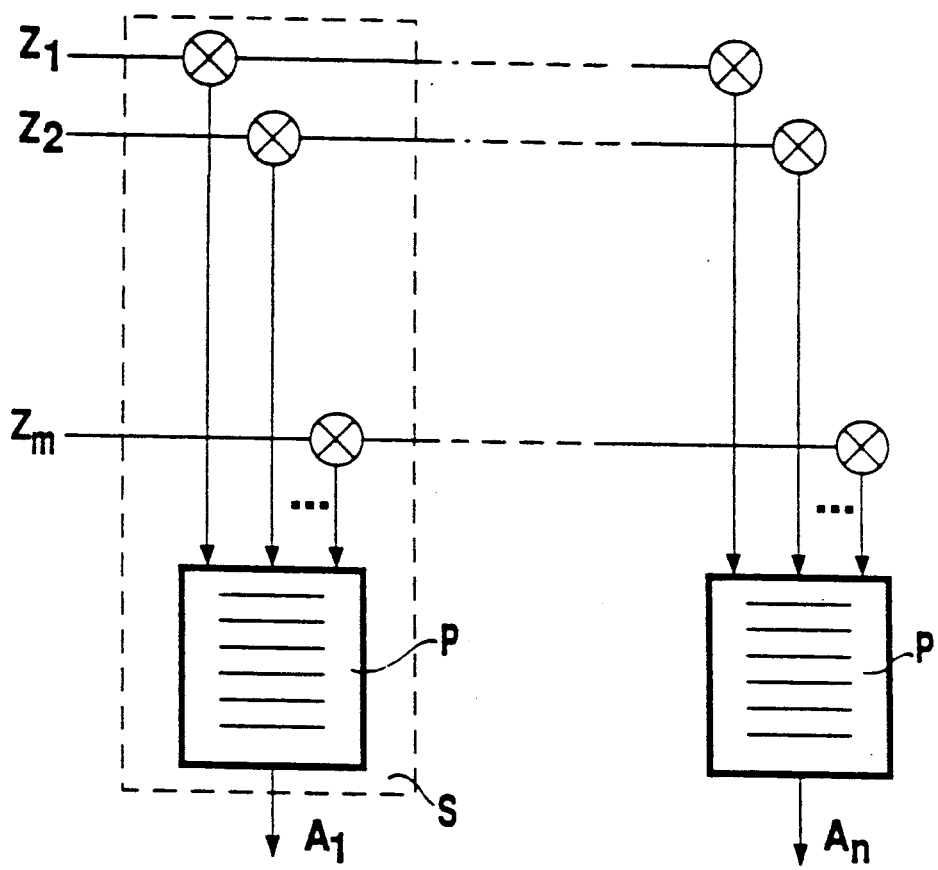
FIG. 1 shows a switching network comprising n m/1 stages having buffers on the output side.

FIG. 1 shows a switching network comprising n m/1 stages S having buffers P on the output side. The cells arriving via the auxiliary lines Z1 ... Zm are to be switched through to one of the trunk lines A1 ... An on the basis of the routing information available in their headers. The m/1 stages S are arranged such that cells simultaneously or virtually simultaneously available on the auxiliary lines Z1 ... Zn, which cells are intended, for example, for the trunk line A1 on the basis of their routing information, are stored immediately on arrival at the buffer P. Subsequently, they are to be read out sequentially from this buffer onto the trunk line A1.

Figure 2:
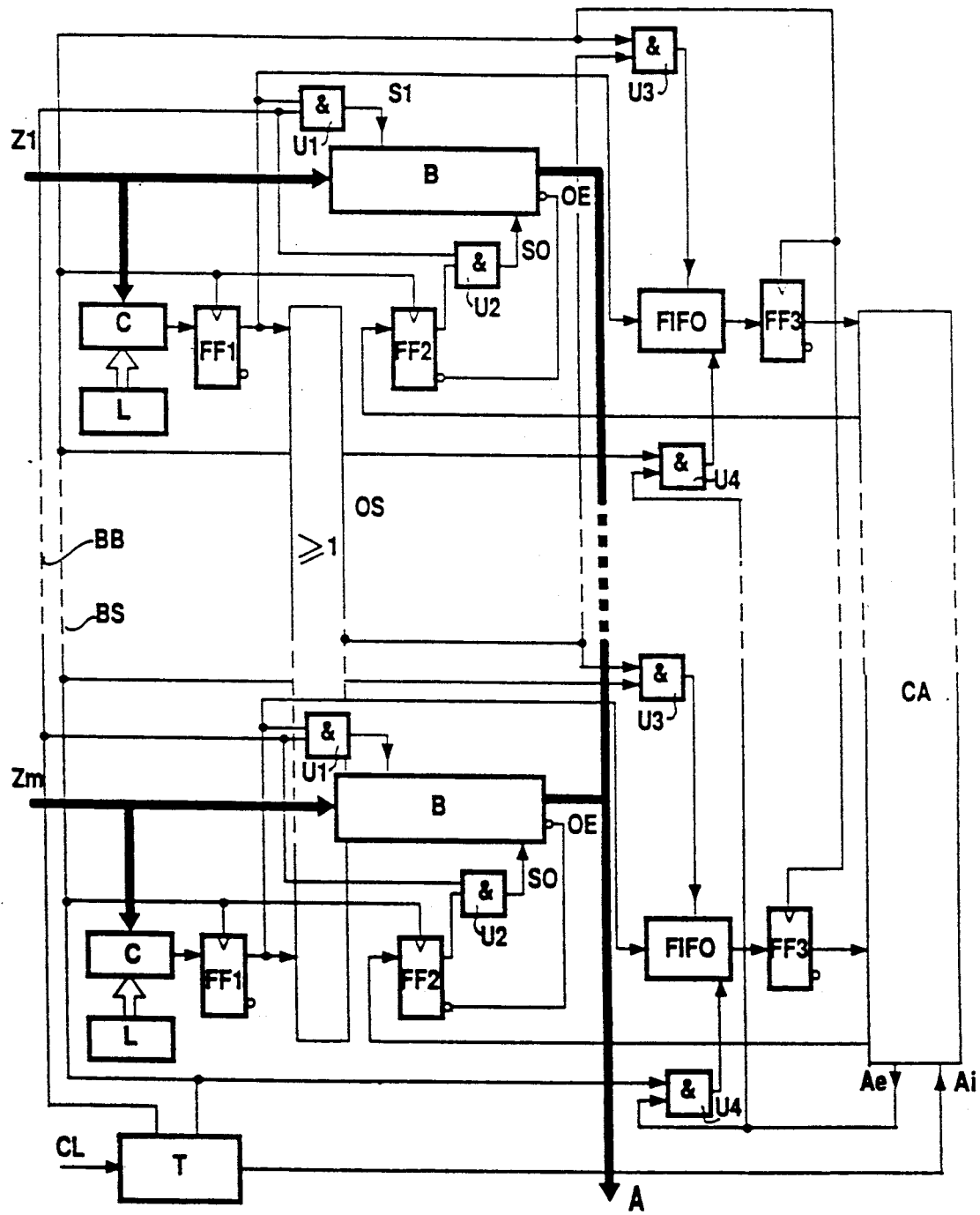
FIG. 2 shows an embodiment of an m/1 stage.

FIG. 2 shows an embodiment of an m/1 stage S. m auxiliary lines Z1 ... Zm can be connected to the input side of the m/1 stage. The cells arriving over the auxiliary lines can be transported over a trunk line A. To each auxiliary line Z1 ... Zm a comparator C and a buffer B are connected. These buffers B form the buffer P diagrammatically shown in FIG. 1. The outputs of the buffer B are all connected to the trunk line A of this m/1 stage. By means of the clock circuit T and on the basis of an input clock Cl the clock signals necessary for controlling the m/1 stage are generated. These clock signals are the cell start signal BS, the cell burst signal BB and the series switching signal Ai. The cell start signal BS and cell burst signal BB control the writing of the cells into the buffer B. To the comparing inputs of the comparators C address stores L are connected containing the addresses of the associated trunk lines A. The bit sample identifying the address of the trunk line A and contained in the address store L is the same for all comparators of this m/1 stage.

A control logic circuit is connected to the buffer B. This circuit comprises a first flip-flop FF1 and a first AND gate U1. The set input of the flip-flop FF1 is connected to the output of the comparator C, whereas the cell start signal BS is applied to the clock input of the flip-flop FF1. The non-inverting output of the flip-flop FF1 is connected to the input of a FIFO memory which can be read into a buffer FF3. This buffer is arranged in the embodiment of the invention as a flip-flop having a non-inverting output and a clock input. The output of the buffer FF3 is connected to the decision circuit CA. Furthermore, the output of the flip-flop FF1 is connected to a first input of the first AND gate U1, to whose second input the cell burst signal BB is applied. The output of the first AND gate U1 is connected to the write-control input of the input buffer B. The control logic circuit further includes a second flip-flop FF2 and a second AND gate U2. To the first input of the AND gate U2 is also applied the cell burst signal BB, whereas the clock input of the flip-flop FF2 receives the cell start signal BS. The non-inverting output of the second flip-flop FF2 is connected to the second input of the AND gate U2, whose output is connected to the input of the buffer B through which the reading of the buffer can be effected (read-control input). The inverting output of the flip-flop FF2 is connected to an input of the buffer B through which the reading of the buffer can be blocked (read-block input) if the signal OE occurs.

The output of the flip-flop FF1 is also connected to a multiple-OR circuit OS to whose input also the flip-flops FF1 of the logic circuits associated to the remaining auxiliary lines Z1 ... Zm are connected. The output of the multiple-OR circuit OS is connected to a first input of a third AND gate U3, whose second input receives the cell start signal BS. The output of the AND gate U3 is connected to the clock input of the FIFO memory, to whose read-control input the output of a fourth AND gate U4 is connected. The cell start signal BS is applied to a first input of this AND gate U4 whereas a series switching signal Ae, which is the series switching signal Ai generated in the clock circuit T applied to the decision circuit CA and delayed and inverted therein, is applied to a second input. The cell start signal Bs is also applied to the clock input of the buffer FF3.

For the operation of the circuit arrangement it is assumed that the data on the auxiliary lines Z1 ... Zm all have synchronized headers. Each comparator C continuously compares the data arriving over the associated auxiliary line to the trunk line A address stored in the memory L. The result is stored in the first flip-flop FF1 simultaneously with the cell start signal BS when routing information occurs. If the routing information matches the address of the trunk line A, the first AND gate U1 is opened as a result of the logic state then occurring at the non-inverting output of the first flip-flop FF1 and a simultaneous cell burst signal BB. Consequently, the write signal SI is generated which enables the data arriving via the auxiliary line to be written into the buffer B. At the same time, a logic 1 is written into the memory FIFO. For each of the auxiliary lines Z1 ... Zm on which no cell is found, a logic 0 is written into the memory FIFO, under control of the multiple-OR circuit OS, provided that on an arbitrary further auxiliary line a cell is found. Thus a logic 1 is written into at least one FIFO memory of the m/1 stage. In this case, the logic state of the respective flip-flop FF1 had arrived, through the multiple-OR circuit, at all AND circuits U3 and at the clock inputs of all memories FIFO as the output signals of the AND circuits U3. Thus the logic state available at the respective outputs of the first flip-flops FF1 is written into the memories FIFO. In this way events order of the on the respective auxiliary lines is stored in their memories FIFO. An exception the intervals during which no cells were found on any auxiliary line, because in such cases no signal arrived at the clock input of the FIFO memory.

The decision circuit CA cyclically allocates the output line A to the auxiliary lines for which a 1 is stored in the respective buffer FF3. Such a cycle being finished, the next position is read from all FIFO memories and the result is stored in each buffer FF3. The end of a cycle of the decision circuit CA is indicated by a change from "LOW" to "HIGH" at an output of the decision circuit CA of the series switching signal Ae produced by the decision circuit CA. This series switching signal Ae is applied to each second input of the AND circuits U4.

A positive decision at an output of the decision circuit CA is stored in the respective flip-flop FF2. Owing to the logic state then occurring at the output of this flip-flop FF2 the associated AND gate U2 is opened when the cell burst signal BB occurs at the same time. The output signal SO then causes the reading of the contents of the buffer B onto the trunk line A. The buffers of the remaining logic circuits of the further auxiliary lines are blocked by means of the signal OE at the output of each flip-flop FF2. The size of the FIFO memory, which stores the "cell arrival/no cell arival" information, is restricted upwards by the length of the queue. This size, however, cannot be established from a point of view of circuit technology, but is determined only by the statistical properties of the process of the arrival of the cells. The dimensioning is effected on the basis of the knowledge or estimate of the traffic ratio of the sources and on the basis of prior-art formulas of the queue theory.

The decision circuit CA thus operates with the logic states of the buffers FF3. Depending on each logic state the allocation of the trunk line A is made. Then, a signal at the output of the buffer FF3 indicating that its logic state is zero is not evaluated specifically.

Figure 3:
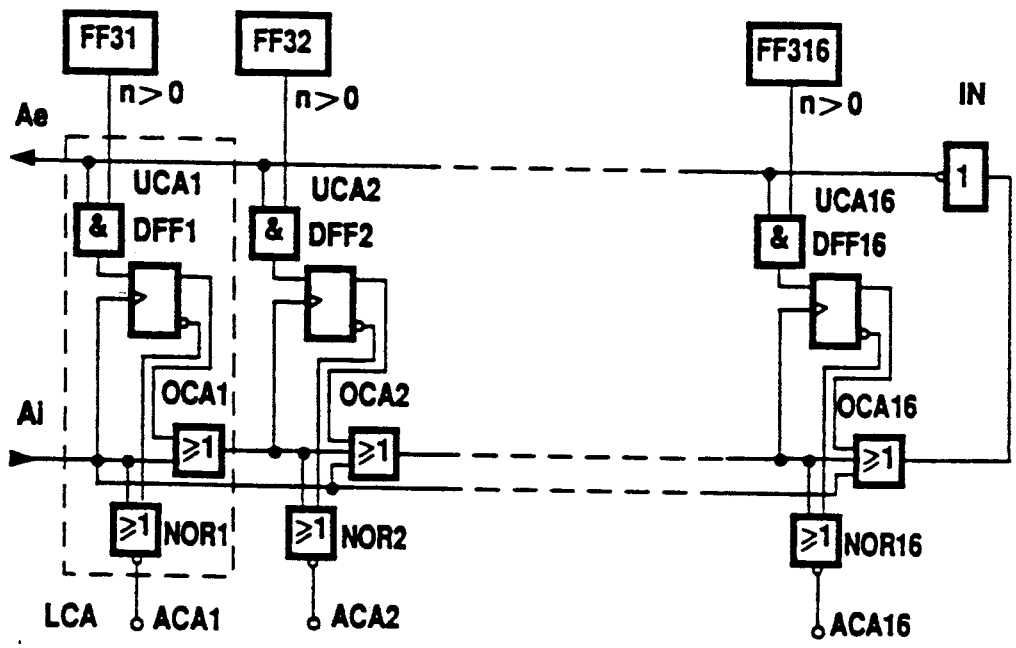
FIG. 3 shows an embodiment of a decision circuit.

FIG. 3 shows an embodiment of a decision circuit CA for a 16/1 stage for sixteen auxiliary lines. Such a decision circuit CA is composed of separate logic circuits LCA having the same structure, each such logic circuit being connected to the output of each of the buffers FF3 of the arrangement shown in FIG. 2.

The logic circuit dedicated to the buffer FF31 comprises an edge-triggered D flip-flop DFF1, to whose D input the output of an AND gate UCA1 is connected whereas to the first input of this AND gate UCA1 the output of the buffer FF31 is connected. The inverting output of this D flip-flop DFF1 is connected to a NOR gate NOR1 and the non-inverting output of this D flip-flop DFF1 is connected to an OR gate OCA1. The outputs of the NOR gate form the outputs ACA1, ACA2, ... of the decision circuit CA and are connected to the relevant inputs of the control logic circuits of the buffer B in the circuit arrangement shown in FIG. 2. Since the clock inputs of the D flip-flops DFF2 ... DFF16 are connected to the non-inverting output of each previous D flip-flop DFF1 ... DFF15 by means of an OR gate, the individual D flip-flops may be considered to be connected in series.

At a first clock input of the decision circuit CA is available a series switching signal Ai generated in the clock circuit T. A positive edge of Ai is produced after the comparator result C, which is always located in the first location of the memories FIFO, has been transferred to the buffer FF3 (FF31 ... FF316). Inside the decision circuit CA the signal Ai is applied to an input of each OR gate OCA1 to OCA16 and, in addition, to the clock input of the first D flip-flop DFF1. The output signal occurring at an output of the decision circuit CA and coming from the output of the OR gate OCA16 is led back to a further input of the decision circuit CA as a series switching signal Ae after passing through an inverter IN and is applied to the second inputs of the AND gates U1 ... U16. Furthermore, it can be applied to further decision circuits in the communication system.

In the sequel the mode of operation of the decision logic described previously will be further explained. It is assumed that a cycle has just been finished and new input information from the buffers FF31 ... FF316 is applied to the inputs of the decision circuit. The series switching signal Ai has the logic state "LOW" and all D flip-flops DFF1 ... DFF16 have stored this logic state "LOW". Consequently, a series switching signal Ae having the logic state "HIGH" is applied to each second input of the AND gate UCA1 ... UCA16 and the AND gates are switched through when the associated counters indicate an output condition exceeding zero.

If a positive edge occurs in the series switching signal Ai, this signal then having a gate delay developed in the OR gate OCA16 passes through the decision circuit CA. The input data are transferred to the D flip-flop DFF1 ... DFF16 so that each flip-flop whose associated counter showed an initial count exceeding zero now has the "HIGH" state at its non-inverting output. After the delay caused by the inverter IN the series switching signal Ae assumes the logic state "LOW" and all AND gates UCA1 to UCA16 are disabled. After some period of time which is sufficient for clocking a D flip-flop, the series switching signal Ai assumes the logic state "LOW". This negative edge passes through the chain of the OR gates up to the first D flip-flop which has stored the "HIGH" state. It causes the output signal at the inverting output of the D flip-flop to be switched through to the output ACA via the associated NOR gate. Via the second flip-flop FF2 in the circuit shown in FIG. 1 this output signal at ACA enables reading of the data stored in the associated buffer B onto the trunk line A. The relevant D flip-flop blocks the D flip-flops coming after it in the series arrangement at the same time as the "HIGH" state occurs at its non-inverting output, because the "HIGH" state is retained after the OR gate. After the data are read from the activated buffer, a new positive edge of the series switching signal Ai is generated in the clock circuit. Consequently, the D flip-flop which previously was in the "HIGH" state, is reset and assumes the logic state "LOW". When now the series switching signal Ai again assumes the logic state "LOW", the next buffer whose associated D flip-flop has stored the logic state "HIGH" can be read out. The cycle described thus will proceed until the last series connected D flip-flop having the logic state "HIGH" has been reset. With the next positive edge of the series switching signal Ai input data can then again be transferred to the D flip-flops DFF1 ... DFF16. This edge falls within the fixed pattern of the positive edges of the series switching signal Ai.

We claim:

1. Switching network for a communication system, comprising m/1 stages which include auxiliary lines (Z1 ... Zm) and have each a trunk line (A) and in which cells are switched through on the basis of routing information contained in a header of each cell and in which a cell arriving at an auxiliary line is written into a buffer (B) dedicated to a trunk line (A) if the routing information and address of this trunk line match and in which a decision circuit (CA) is included in each m/1 stage, characterized in that, in each m/1 stage, each auxiliary line (Z1 ... Zm) is assigned a memory (FIFO) to which are applied the results of the comparisons of the routing information and address of the trunk line (A) and the contents of the memory (FIFO) are applied to the decision circuit (CA) which, on the basis of these contents, determines the order in which the cells stored in the buffers (B) are read out.

2. An m/1 stage for use in a switching network for use in a communication system, where m is an integer greater than one, the stage comprising a) m inputs for coupling with m auxiliary lines (Z1 ... Zm) to receive from the auxiliary lines a plurality of cells, b) an output for coupling with a respective trunk line (A), and c) means for switching cells through the stage on the basis of routing information contained in cell headers, which switching means comprises:

i) m means (C) for comparing the cells' routing information with an address of the respective trunk line, ii) m memory means (FIFO), each for storing a result output by a respective one of the means for comparing, and iii) m buffers (B), each for storing cells received from a respective one of the auxiliary lines, when the cells' routing information matches the address of the respective trunk line, and iv) a decision circuit (CA), responsive to the contents of the memory means, for determining an order for reading cells out of the buffers onto the output.

3. The stage of claim 2 further comprising a) a multiple-OR circuit (OS) common to all of the auxiliary lines, having input means coupled to receive the results from the means for comparing, and
b) m AND circuits (U3), one for each auxiliary line, each having
   i) a respective input coupled to an output of the multiple-OR circuit and
   ii) a respective output coupled to a write control input of a respective one of memory means.

4. The stage of claim 3
a) further comprising
   i) m flip-flops (FF1), each having
      A) a respective input coupled to receive the result from a respective one of the means for comparing; and
      B) a respective output coupled to an input of the respective memory means;
   ii) m second AND gates (U1) each having
      A) a respective input coupled to the output of a respective one of the flip-flops; and
      B) a respective output coupled to a control input of a respective one of the buffers (B); and wherein
b) each means for comparing is a respective comparator; and
c) the input means of the multiple-OR circuit includes a plurality of inputs each coupled to the output of a respective one of the flip-flops.

5. The stage of claim 4 further comprising
a) m third AND gates (U2), each having a respective output coupled to a further input of a respective one of the buffers;
b) m second flip-flops (FF2), each having
   i) a respective input coupled to a respective output of the decision circuit, and
   ii) a respective output coupled to an input of a respective one of the third AND gates, and
wherein the decision circuit causes the respective buffers to be read out via the respective second flip-flops and the respective third AND gates.

6. The stage of claim 2
further comprising m second buffers (FF3), each having a respective input coupled to an output of a respective one of the memory means, for receiving contents of the respective one of the memory means, as the memory means are read out cyclically, and
wherein the decision circuit evaluates states of the second buffers.

7. The stage of claim 6
a) further comprising
   i) m flip-flops (FF1), each having a respective input coupled to receive the result from a respective one of the means for comparing and each having a respective output coupled to an input of a respective one of the memory means;
   ii) m second AND gates (U1) each having:
      A) a respective input coupled to the output of a respective one of the flip-flops; and
      B) a respective output coupled to a control input of a respective one of the buffers (B); and wherein
b) each means for comparing is a respective comparator;

c) the input means of the multiple-or circuit includes a plurality of inputs each coupled to the output of a respective one of the flip flops.

8. The stage of claim 7 further comprising
a) m third AND gates (U2), each having an output coupled to a further input of a respective one of the buffers;
b) m second flip-flops (FF2), each having:
   i) a respective input coupled to a respective output of the decision circuit, and
   ii) a respective output coupled to an input of a respective one of the third AND gates,
wherein the decision circuit causes the respective buffers to be read out via the respective second flip-flops and the respective third AND gates.

9. The stage of claim 6, wherein the decision circuit comprises m logic circuits (LCA), one for each of the second buffers, and the decision circuit controls reading out of the buffers based on contents of the second buffers.

10. The stage of claim 9 wherein each logic circuit comprises
a) a respective decision circuit AND gate (UCA1 . . . UCA16), each having an input coupled with a respective one of the second buffers,
b) a respective decision circuit flip-flop (DFF1 . . . DFF16), having a respective input coupled to the output of the respective decision circuit AND gate,
c) a respective OR gate (OCA1 . . . OCA16), having a respective input coupled with an output of the respective decision circuit flip-flop, and
d) a respective NOR gate (NOR1 . . . NOR16), having a respective input coupled to a second output of the respective decision circuit flip-flop.

11. The stage of claim 10
I. further comprising
   a) means, disposed within the switching means, for generating a first series switching signal (Ai); and
   b) m respective further AND gates (U4); and
II. wherein within each logic circuit,
   a) a respective second input of each of the OR gates is coupled to receive the first series switching signal;
   b) a respective second input of each of the NOR gates is coupled to receive the first series switching signal;
   c) the respective output of each of the OR gates is connected to a respective third input of a respective subsequent one of the OR gates, except for a respective last one of the OR gates,
   d) the respective output of the respective last one of the OR gates provides a second series switching signal (Ae);
   e) a respective second input of each of the decision circuit AND gates is coupled to receive the second series switching signal;
   f) a respective input of each of the further AND gates is coupled to receive the second series switching signal.

12. A switching network comprising
a) m auxiliary lines for receiving cells;
b) a plurality of stages as claimed in any of claims 9-18; and
c) a plurality of trunk lines for output, a respective trunk line corresponding with each stage.

* * * * *